(12) United States Patent
Parker et al.

(10) Patent No.: US 6,601,339 B1
(45) Date of Patent: *Aug. 5, 2003

(54) PLANT WATERING SYSTEM

(76) Inventors: Johnny M. Parker, P.O. Box 499, Edmondson, AR (US) 72332; Vivian M. Parker, P.O. Box 499, Edmondson, AR (US) 72332

( * ) Notice: Subject to any disclaimer, the term of this patent is extended or adjusted under 35 U.S.C. 154(b) by 0 days.

This patent is subject to a terminal disclaimer.

(21) Appl. No.: 09/839,083

(22) Filed: Apr. 23, 2001

(51) Int. Cl.[7] ............................................... A01G 29/00
(52) U.S. Cl. ...................................................... 47/48.5
(58) Field of Search ........................................... 47/48.5

(56) References Cited

U.S. PATENT DOCUMENTS

| | | | | |
|---|---|---|---|---|
| 3,005,287 A | * | 10/1961 | Dudley | 47/21.1 |
| 4,087,938 A | * | 5/1978 | Koch | 47/48.5 |
| 4,268,992 A | * | 5/1981 | Scharf, Sr. | 47/23 |
| 4,336,666 A | * | 6/1982 | Caso | 47/48.5 |
| 5,456,044 A | * | 10/1995 | Parker et al. | 47/27 |

* cited by examiner

Primary Examiner—Peter M. Poon
Assistant Examiner—Son T. Nguyen
(74) Attorney, Agent, or Firm—Edward P. Dutkiewicz

(57) ABSTRACT

A plant watering system comprises a base. The base has a periphery. The base also has a central hole. A slot is provided between the central hole and the periphery. The base has an interior wall. The interior wall extends upwardly from the base at the central hole. The base also has an exterior wall. The exterior wall extends upwardly from the base at the periphery. A pair of walls extend upwardly from the base on both sides of the slot. A small supplemental hole extends through the base at a position diametrically opposite from the slot. A pipe has a top portion coupled to the supplemental hole. The pipe also has a bottom portion. The bottom portion extends downwardly from the top portion. In addition, the pipe has apertures. The apertures facilitate the dispensing of water from the container to the pipe.

1 Claim, 3 Drawing Sheets

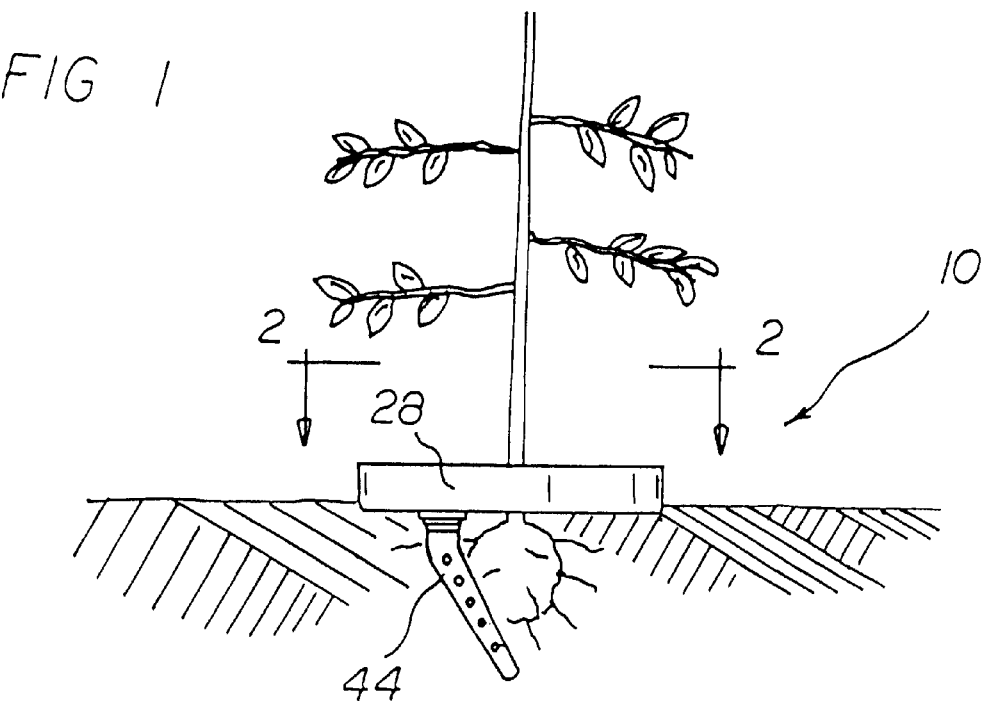
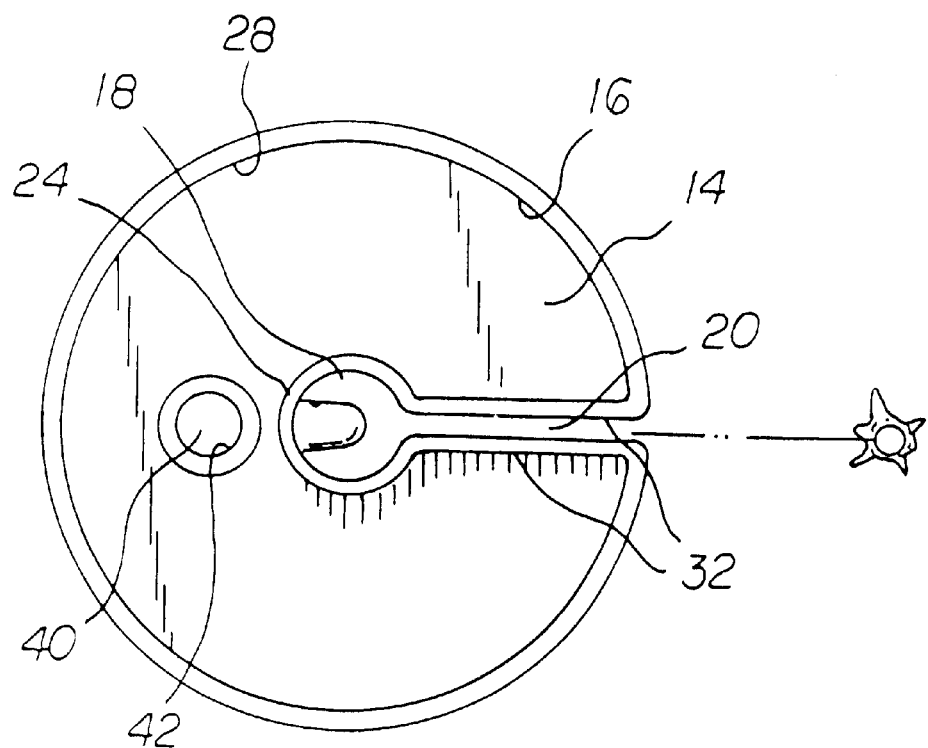

PLANT WATERING SYSTEM

BACKGROUND OF THE INVENTION

1. Field of the Invention

The present invention relates to a plant watering system and more particularly pertains to providing water to young plants while allowing for ready deployment, and removal, of the system with respect to the plant.

2. Description of the Prior Art

The use of systems for watering plants of known designs and configuration is known in the prior art. More specifically, systems for watering plants of known designs and configuration previously devised and utilized for the purpose of watering plants through conventional methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,456,044 to Parker, et al. discloses a tomato pot. U.S. Pat. No. 4,677,788 to Mastandrea discloses a support for tomato plants and the like. U.S. Pat. No. 4,745,706 to Muza discloses a plant watering and feeding stake. U.S. Pat. No. 4,870,781 to Jones discloses a combination tree support and feeder stake. Lastly, U.S. Pat. No. 4,922,653 to Stone discloses a plant watering and feeding support system.

While these devices fulfill their respective, particular objectives and requirements, the aforementioned patents do not describe a plant watering system that allows providing water to young plants while allowing for ready deployment, and removal, of the system with respect to the plant.

In this respect, the plant watering system according to the present invention substantially departs from the conventional concepts and designs of the prior art, and in doing so provides an apparatus primarily developed for the purpose of providing water to young plants while allowing for ready deployment, and removal, of the system with respect to the plant.

Therefore, it can be appreciated that there exists a continuing need for a new and improved plant watering system which can be used for providing water to young plants while allowing for ready deployment, and removal, of the system with respect to the plant. In this regard, the present invention substantially fulfills this need.

SUMMARY OF THE INVENTION

In view of the foregoing disadvantages inherent in the known types of systems for watering plants of known designs and configuration now present in the prior art, the present invention provides an improved plant watering system. As such, the general purpose of the present invention, which will be described subsequently in greater detail, is to provide a new and improved plant watering system and method which has all the advantages of the prior art and none of the disadvantages.

To attain this, the present invention essentially comprises a base in an essentially circular configuration. The base has a periphery. The base also has a central hole. The central hole extends through the base. The base also has a slot. The slot runs from the central hole to the periphery. The slot has a width less than the diameter of the central hole. The diameter of the periphery is between about 4 and 6 times the diameter of the central hole. Next provided is an essentially cylindrical interior wall. The interior wall extends upwardly from the base at the central hole. A gap is provided above a portion of the slot. The gap has a width equal to the width of the slot. Provided next is an essentially cylindrical exterior wall. The exterior wall extends upwardly from the base at the periphery. A gap is also provided above a portion of the slot. The gap has a width equal to the width of the slot. A pair of linear parallel walls are also provided. The linear parallel walls extend upwardly from the base on both sides of the slot. The parallel walls have interior ends connecting with the interior wall. The linear parallel walls have exterior ends connecting with the exterior wall. All of the walls as well as the base are integrally formed of an elastomeric material, plastic or rubber, natural or synthetic, or blends thereof. All of the walls have an essentially common height. The height is essentially equal to the diameter of the central hole plus or minus 20 percent. All of the walls and the base form a generally C-shaped container. The C-shaped container surrounds the central hole except above the slot with an open top for adding water to the container. The container is adapted to retain and dispense water. The slot allows the system to be deployed with respect to a young plant needing water. The slot also allows the system to be removed from a plant after it has reached a proper maturity. Next provided is a small supplemental hole. The small supplemental hole extends through the base at a position diametrically opposite from the slot. The small supplemental hole has female threads. Last provided is a pipe. The pipe has a top portion. Provided around the top portion are male threads. The male threads are removably coupled to the supplemental hole. The pipe also has a bottom portion. The bottom portion extends downwardly from the top portion. The bottom portion is angled with respect to the vertical and extends to beneath the central hole. The pipe also has apertures. The apertures facilitate the dispensing of water from the container to the pipe and then to plant roots to one side of, and above, the pipe.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved plant watering system which has all of the advantages of the prior art systems for watering plants of known designs and configuration and none of the disadvantages.

It is another object of the present invention to provide a new and improved plant watering system which may be easily and efficiently manufactured and marketed.

It is further object of the present invention to provide a new and improved plant watering system which is of durable and reliable constructions.

An even further object of the present invention is to provide a new and improved plant watering system which is susceptible of a low cost of manufacture with regard to both materials and labor, and which accordingly is then susceptible of low prices of sale to the consuming public, thereby making such plant watering system economically available to the buying public.

Even still another object of the present invention is to provide a plant watering system for providing water to young plants while allowing for ready deployment, and removal, of the system with respect to the plant.

Lastly, it is an object of the present invention to provide a new and improved plant watering system comprising a base. The base has a periphery. The base also has a central hole. A slot is provided between the central hole and the periphery. The base has an interior wall. The interior wall extends upwardly from the base at the central hole. The base also has an exterior wall. The exterior wall extends upwardly from the base at the periphery. A pair of parallel walls extend upwardly from the base on both sides of the slot. A small supplemental hole extends through the base at a position diametrically opposite from the slot. A pipe has a top portion coupled to the supplemental hole. The pipe also has a bottom portion. The bottom portion extends downwardly from the top portion. In addition, the pipe has apertures. The apertures facilitate the dispensing of water from the container to the pipe.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of the preferred embodiment of the new and improved plant watering system constructed in accordance with the principles of the present invention.

FIG. 2 is a top elevational view of the pot shown in FIG. 1.

The same reference numerals refer to the same parts throughout the various Figures.

DESCRIPTION OF THE PREFERRED EMBODIMENT

Figure 3:
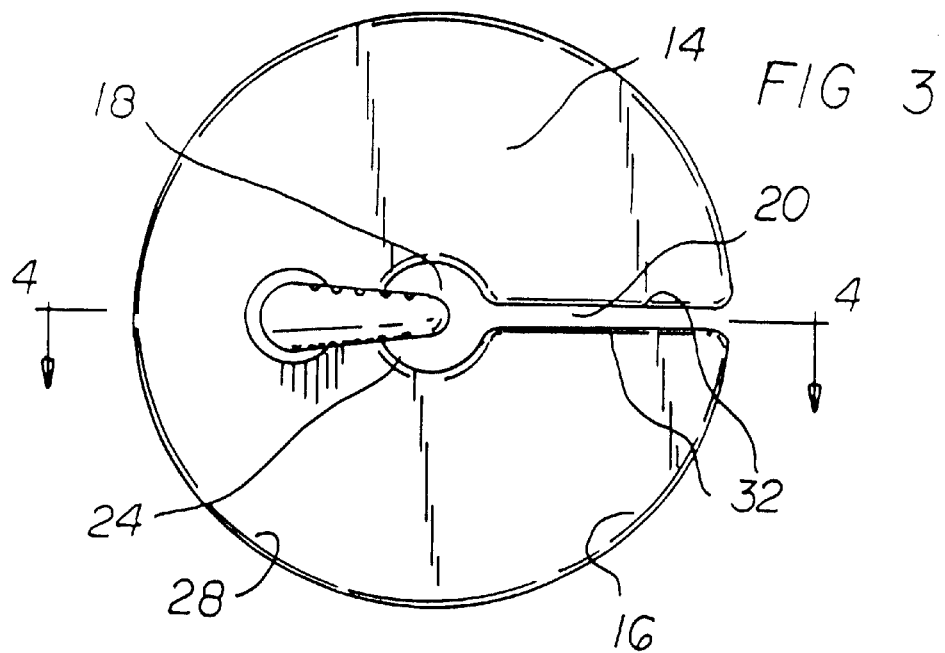
FIG. 3 is a bottom elevational view of the port shown in FIGS. 1 and 2 including the watering pipe.
Figure 4:
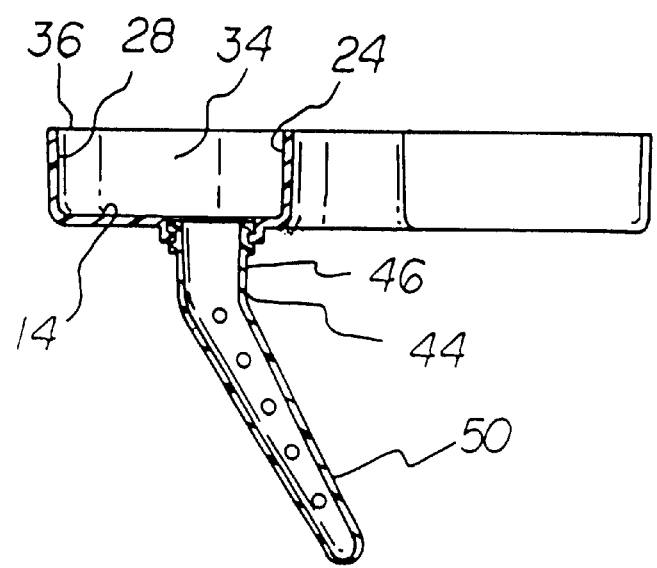
FIG. 4 is a cross-sectional view of the pot taken along line 4—4 of FIG. 3.
Figure 5:
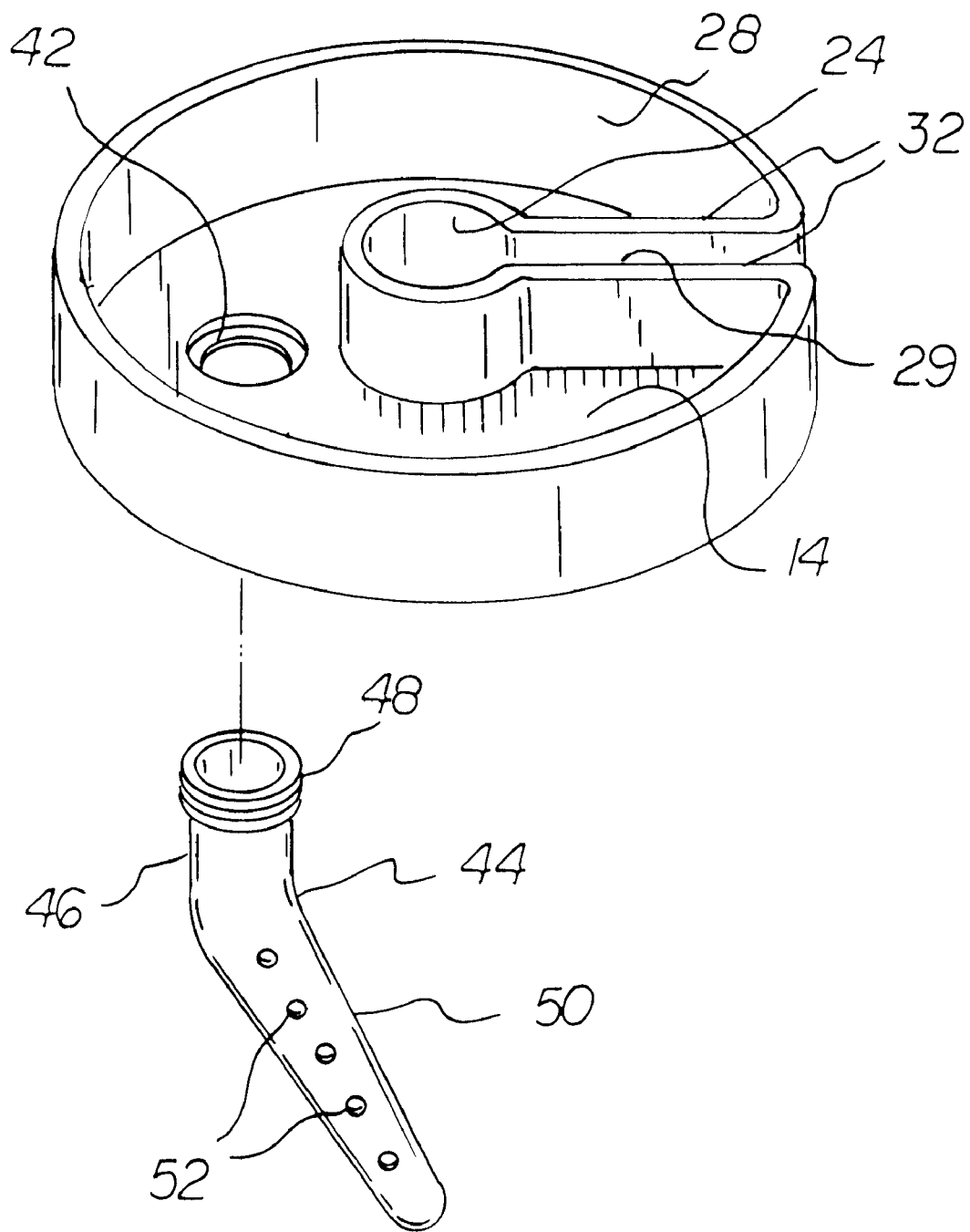
FIG. 5 is an exploded perspective view of the pot shown in the prior Figures including the associated components.

With reference now to the drawings, and in particular to FIG. 1 thereof, the preferred embodiment of the new and improved plant watering system embodying the principles and concepts of the present invention and generally designated by the reference numeral 10 will be described.

The present invention, the plant watering system 10 is comprised of a plurality of components. Such components in their broadest context include a base, an interior wall, an exterior wall, a pair of parallel walls, a small supplemental hole and a pipe. Such components are individually configured and correlated with respect to each other so as to attain the desired objective.

First provided is a base 14 in an essentially circular configuration. The base has a periphery 16. The base also has a central hole 18. The central hole extends through the base. The base also a slot 20. The slot runs from the central hole to the periphery. The slot has a width less than the diameter of the central hole. The diameter of the periphery is between about 4 and 6 times the diameter of the central hole.

Next provided is an essentially cylindrical interior wall 24. The interior wall extends upwardly from the base at the central hole. A gap 29 is provided above a portion of the slot. The gap has a width equal to the width of the slot.

Provided next is an essentially cylindrical exterior wall 28. The exterior wall extends upwardly from the base at the periphery. The gap is also above a portion of the slot. The gap has a width equal to the width of the slot.

A pair of linear parallel walls 32 are also provided. The linear parallel walls extend upwardly from the base on both sides of the slot. The parallel walls have interior ends connecting to the interior wall. The linear parallel walls have exterior ends connecting to the exterior wall. Although the linear walls of the preferred embodiment are parallel, in alternate embodiments the walls could extend upwardly at any angle. All of the walls as well as the base are integrally formed of an elastomeric material, plastic or rubber, natural or synthetic, or blends thereof. All of the walls have an essentially common height. The height is essentially equal to the diameter of the central hole plus or minus 20 percent. All of the walls and the base form a generally C-shaped container 34. The C-shaped container surrounds the central hole except above the slot with an open top 36 for adding water to the container. The container is adapted to retain and dispense water. The slot allows the system to be deployed with respect to a young plant needing water. The slot also allows the system to be removed from a plant after it has reached a proper maturity.

Next provided is a small supplemental hole 40. The small supplemental hole extends through the base at a position diametrically opposite from the slot. The small supplemental hole, in the preferred embodiment, has female threads 42. In alternate embodiments, the threads could be eliminated and coupling accomplished by a snap or simple friction fit.

Last provided is a pipe 44. The pipe has a top portion 46. Provided around the top portion are male threads 48. The male threads removably couple the pipe to the supplemental hole. The pipe also has a bottom portion 50. The bottom portion extends downwardly from the top portion. The bottom portion is angled with respect to the vertical and extends to beneath the central hole. The pipe also has apertures 52. The apertures facilitate the dispensing of water from the container to the pipe and then to plant roots to one side of, and above, the pipe. Although the pipe in the preferred embodiment is provided with threads and is at an angle, alternate embodimdents could include the pipe being coupled to the hole in a wide variety of alternate manners including a snap-on or simple friction fit and the pipe could be at any angle or vertical.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A plant watering system for providing water to young plants while allowing for ready deployment and removal of the system with respect to the plant comprising, in combination:

a base in a circular configuration with an open top and a periphery and with a central hole extending through the base and with a slot running from the central hole to the periphery, the slot having a width less than the diameter of the central hole, the diameter of the periphery being between about 4 and 6 times the diameter of the central hole;

a cylindrical interior wall extending upwardly from the base at the central hole and with a gap having a width equal to the width of the slot above a portion of the slot;

a cylindrical exterior wall extending upwardly from the base at the periphery and with a gap having a width equal to the width of the slot above a portion of the slot;

a pair of linear parallel walls extending upwardly from the base on both sides of the slot, the parallel walls having interior ends connecting with the interior wall, the linear parallel walls having exterior ends connecting with the exterior wall, all of the walls as well as the base being integrally formed of an elastomeric material, all of the walls having a common height essentially equal to the diameter of the central hole plus or minus 20 percent, all of the walls and the base forming a generally C-shaped container surrounding the central hole except above the slot with an open top for adding water to the container, the container being adapted to retain and dispense water with the slot allowing the system to be deployed with respect to a young plant needing water and removed from a plant after it has reached a proper maturity;

a small supplemental hole extending through the base at a position diametrically opposite from the slot, the small supplemental hole being formed with female threads; and a pipe having a top portion with male threads there around removably coupled to the supplemental hole, the pipe also having a bottom portion extending downwardly from the top portion, the bottom portion being angled with respect to the vertical and extending to beneath the central hole, the pipe also having apertures to facilitate the dispensing of water from the container to the pipe and then to plant roots to one side of, and above, the pipe.

* * * * *